US005605506A

United States Patent [19]

Hoorn et al.

[11] Patent Number: 5,605,506

[45] Date of Patent: Feb. 25, 1997

[54] CANDLE ANTENNA

[75] Inventors: Dennis W. Hoorn, Sparks, Nev.; David W. Loar, Reno, Calif.; Roy E. Adams, Reno, Nev.

[73] Assignee: International Game Technology, Reno, Nev.

[21] Appl. No.: 449,349

[22] Filed: May 24, 1995

[51] Int. Cl.$^6$ .......... H04B 10/00

[52] U.S. Cl. .......... 463/47; 463/47; 455/90; 362/253

[58] Field of Search .......... 463/48, 42, 47, 463/30, 31, 46; 273/148 B, 460; 455/66, 90; 362/253, 457, 458

[56] References Cited

U.S. PATENT DOCUMENTS

| | | | |
|---|---|---|---|
| 1,720,544 | 7/1929 | DeForest | 362/253 |
| 2,240,328 | 4/1941 | Crowley | 362/253 |
| 2,275,507 | 3/1942 | Crowley et al. | 362/253 |
| 2,583,066 | 1/1952 | Stiffel | 362/253 |
| 4,099,722 | 7/1978 | Reodesch et al. | 273/143 R |
| 5,116,055 | 5/1992 | Tracy | 463/42 |
| 5,259,616 | 11/1993 | Bergmann | 463/17 |
| 5,424,859 | 6/1995 | Uehara et al. | 455/90 |

OTHER PUBLICATIONS

Jasik, Henry; "Antenna Engineering Handbook"; McGraw–Hill, 1993. table of contents.

Stutzman, Warren L. and Thiele, Gary A.; "Antenna Theory and Design"; John Wiley & Sons, 1981. pp. 71–72, 79–82, 85, 92, 98, 168, 189, 192, 252–253, 260–262, 375, 106.

Rules of the Federal Communications Commission, 47 CFR § 15.247 Operation within the bands 902–928 MHz, 2400–2483.5 MHz, and 5725–5850 MHz, and 47 CFR § 15.209 Radiated emission limits.

*Primary Examiner*—Jessica Harrison
*Assistant Examiner*—James Schaaf
*Attorney, Agent, or Firm*—Hickman Beyer & Weaver

[57] ABSTRACT

An antenna for a wireless network is disclosed. The network includes multiple gaming machines such as slot machines or video poker machines located in an establishment. These machines communicate certain playing data (coin-in, coin-out data, etc.) to a central computer over the wireless network. Antennas for the gaming machines are located in a conventional candle on top of the gaming machine. Such candles typically contain one or more lights which when illuminated indicate a certain event such as a jackpot being hit. The disclosed antenna is unobtrusively located within a conventional candle structure so that from its exterior, a candle antenna appears to be a normal candle of the type typically used on gaming machines. However, interior to the candle antenna is an antenna capable of sending and receiving signals of a particular radio frequency band.

30 Claims, 4 Drawing Sheets

FIG. 4D
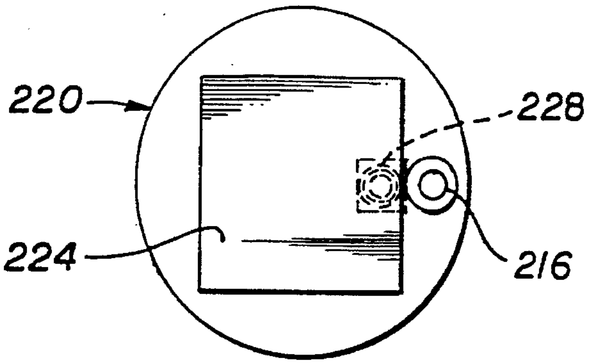
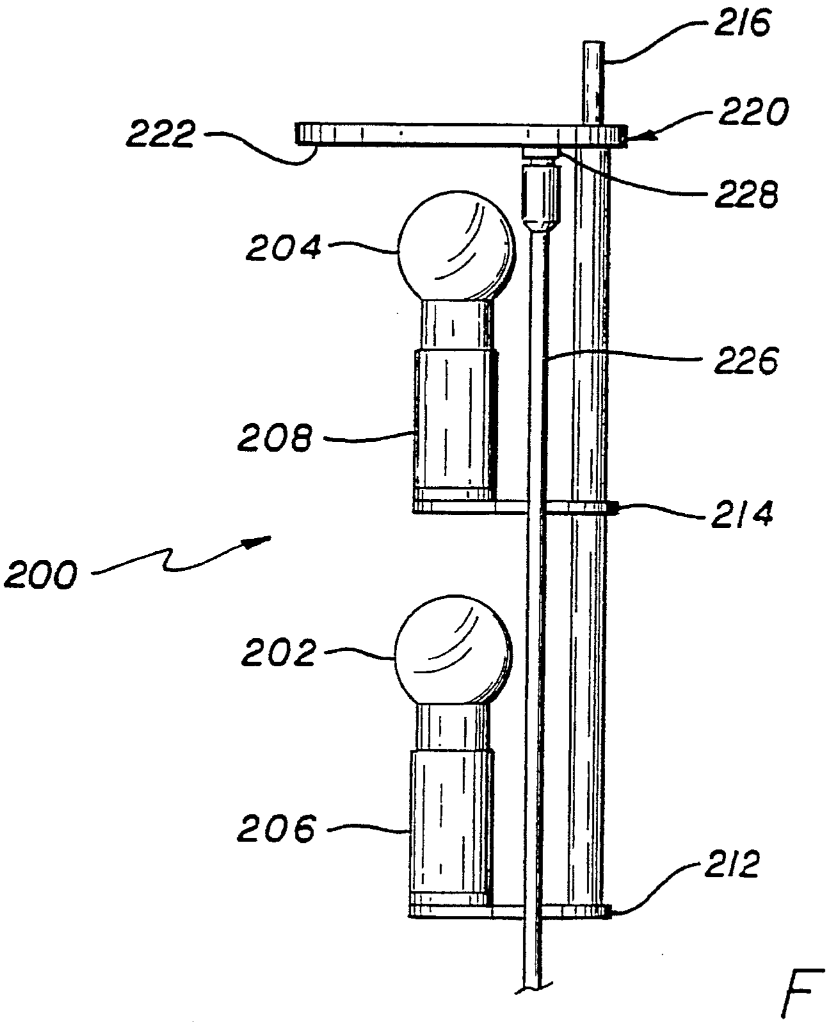
FIG. 4C

CANDLE ANTENNA

BACKGROUND OF THE INVENTION

Casinos derive much of their revenue from gaming machines such as slot machines, video poker machines, etc. Increasingly, casinos have come to rely on local area networks (or "LANs") for monitoring the activity of their various machines. With a LAN, the casino operator can easily tally the coin-in, coin-out, and other data associated with each gaming machine. In addition, the LANs of multiple casinos can communicate among themselves via a wide area network (or "WAN") to share information for various purposes. One such application of a WAN is in progressive games which allow jackpots from multiple machines in multiple locations to grow as one large jackpot. Thus, a player could win a potentially huge jackpot by playing a small denomination machine, e.g., a player could win one million dollars or more by playing a quarter (25 cent) slot machine, or as much as 8 to 9 million dollars by playing a dollar machine.

To maximize customer appeal, casino operators periodically move their various gaming machines to new locations within their establishments. Unfortunately, such moves can be difficult, time consuming, and expensive. This is particularly true for casinos in which the gaming machines are connected on a LAN. In such cases, many or all of the wire connections among the machines must be pulled out and replaced during each move. In fact, reconfiguring the wires is often the most expensive part of a move.

To simplify the moving procedure, it has been proposed to employ a "wireless" LAN in which each gaming machine includes a radio transceiver for communicating with a base station radio. The base station radio, in turn, communicates data from the gaming machines to a central host computer (sometimes referred to as a "server"). When it comes time to rearrange the floor layout of the gaming machines connected over a wireless LAN, the move can be made with comparative ease, as no wires need to be disconnected, reconnected, etc.

All wireless transceivers require an antenna to send and receive radio frequency signals. In the proposed wireless LANs for casinos, each gaming machine would have its own transceiver and associated antenna. Such antennas must be mounted in locations were they can send and receive radio signals unimpeded by structures which would absorb such signals. Thus, a machine antenna must not be blocked by a conductive structure in its "line of sight" with a radio base station's antenna. Being aware of this basic requirement, one might assume that an antenna should be placed on the exterior of a gaming machine at a location facing toward the base station's antenna.

Unfortunately, some gaming machine users can be expected to tamper with or destroy new structures prominently featured on the gaming machine exterior. Some users would likely try to defeat the new system by interfering with the transmission or reception of radio signals. Other users may be afraid to use a particular machine if it has a feature which is unfamiliar to them.

Thus, it would be desirable to have a new gaming machine design adapted to handle wireless transmission, but at the same time not encourage some users to tamper or discourage other users from playing.

SUMMARY OF THE INVENTION

The present invention provides an antenna located within a gaming machine's candle. Such antennas are referred to herein as "candle antennas." As is known to those of skill in the art, candles are prominent structures employed on top of gaming machines to signal certain predesignated events such as hitting a jackpot. Specifically, the candle typically includes one or more light sources which, when illuminated, signify to those in the casino that one of the predesignated events has occurred. The candle antenna of this invention appears from its exterior to be a normal candle of the type typically used on gaming machines. However, interior to the candle antenna is an antenna capable of sending and receiving signals in a particular radio frequency band. Because the candle antenna appears to be a normal candle, players will not, it is expected, recognize that the gaming machine is actually sending and receiving data over a wireless modem.

In one aspect, the present invention provides a candle antenna assembly which can be characterized by the following elements: (1) a substantially hollow candle housing which is at least partially transparent to light; (2) a first light source within the candle housing (typically two or more light sources are used in a candle); and (3) an antenna within the candle housing. Preferably, the antenna is mounted on a ground plane which is positioned above the first light source (at least when the candle housing is mounted in its normal position on top of a gaming machine). Thus, when the gaming machine is operating, the antenna will be located near the top of the candle structure where it can send radio frequency signals to "higher" locations within the casino. Such locations might include the casino ceiling, where an antenna for a base station is preferably located. In such cases, signals generally can be sent unobstructed between the gaming machine's candle antenna and the central computer's antenna. To further ensure that the candle antenna will be able to send and receive signals regardless of where it is located on the casino floor, the antennas used in this invention preferably have a substantially hemispherical intensity distribution (directed above the gaming machine).

Conventional candles also include vertical rods within their housings. Such rods serve various functions such as aligning the "caps" provided on top of candles. In the present invention, the rod has an additional function: to support the ground plane on which an antenna is mounted. Further in this invention, the rod may be used to hide a conductive line (e.g., coaxial cable) coupled to the antenna and extending downward within the candle housing. This is accomplished by stringing the conductive line so that it is substantially parallel with the rod, and it is positioned along a line of sight defined between rod and the first light source. A conductive line so positioned will not cast a shadow appearing any differently than a shadow cast by a rod in a conventional candle.

In another aspect, the present invention provides an entire wireless system in a establishment. The system may be defined to include the following: (1) a plurality of gaming machines, each including (a) a machine chassis having an upper surface, (b) a candle mounted on the machine chassis upper surface, (c) an antenna located within the candle, and (d) a first transceiver electrically coupled to the antenna; (2) a host computer programmed to process data from the plurality of gaming machines; and (3) a second transceiver (sometimes referred to as a "base station" herein) electrically coupled to the host computer, wherein the plurality of gaming machines and the host computer together form part of a LAN. By way of example, an antenna for the host computer is located in the ceiling of the establishment. Preferably, the transceivers of the wireless system communicate via radio frequency signals on an ISM band; most preferably, the band is between about 2.4 and 2.48 GHz. Further, the transceivers preferably are adapted to send and receive spread spectrum signals.

Yet another aspect of the present invention is a method of communicating over a wireless LAN connecting a plurality of gaming machines and a host computer. The method may be characterized as including the following steps: (1) generating playing data at one of the plurality of gaming machines; and (2) transmitting that data through a candle antenna (as defined above) on the gaming machine generating the playing data. The playing data may be any form of data associated with a gaming machine including various playing statistics, status messages, alarm conditions, etc. The method will, of course, also include a step of receiving the playing data at a transceiver associated with the host computer. The method will still further include a step of sending data from the transceiver associated with the host computer to the candle antenna(s) of a specified gaming machine(s).

These and other features of the present invention will be presented in more detail in the following detailed description of the invention and the associated figures.

BRIEF DESCRIPTION OF THE DRAWINGS

FIG. 4C is a side view of a candle antenna constructed in accordance with an alternative embodiment of the present invention.

FIG. 4D is a top view of the candle antenna depicted in FIG. 4C.

DESCRIPTION OF THE PREFERRED EMBODIMENTS

Figure 1:
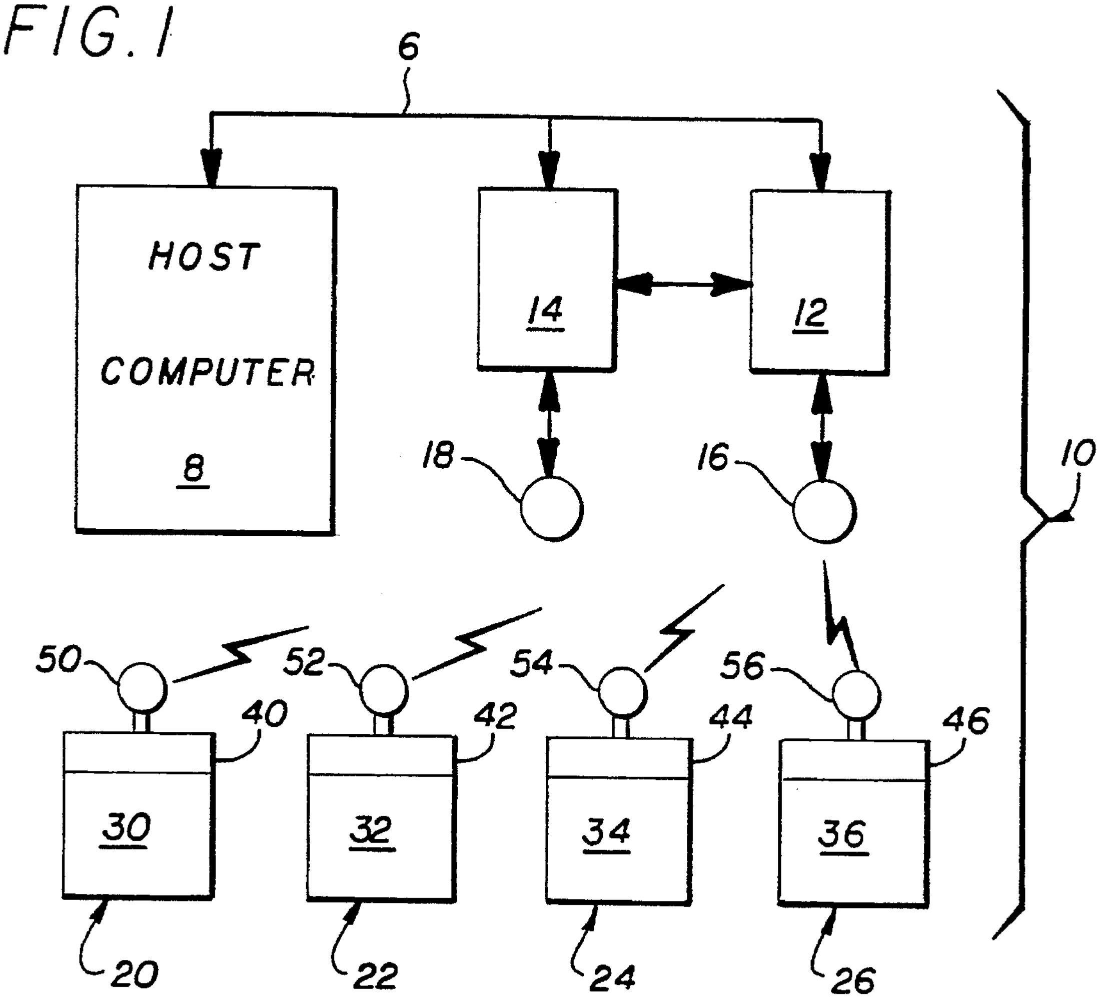
FIG. 1 is a block diagram showing the principle elements of a wireless communications system in which a candle antenna of the present invention may be employed.

FIG. 1 is a block diagram showing some elements of a wireless system suitable for use with candle antennas of the present invention. The wireless system 10 includes a host computer (or "server") 8 which communicates with primary and secondary radio base station radios 12 and 14 respectively over a line 6. The secondary base station 14 is a redundant station used to back up the primary base station 12 should it go down. Both base stations 12 and 14 include low profile antennas: antenna 16 for the primary station and antenna 18 for the secondary base station. The base stations send and receive radio frequency signals to a plurality of gaming machines 20, 22, 24, and 26. These machines, in turn, send and receive radio frequency signals through antennas 50, 52, 54, and 56 which are attached to electronic gaming machine components 30, 32, 34, and 36 through transceivers 40, 42, 44, and 46. Although only four gaming machines have been shown in this example, many more may be employed in a given casino (e.g., up to 100 or more per base station radio).

The host computer 8 may be any of a variety of commercially available computer systems. Such machines include, but are not limited to, DEC VAX, IBM AS 400 or PC compatibles. The central computer system can, also, include multiple work stations, terminals, disk drives with fixed and/or removable media all connected over a communication network consistent with industry standards (Token Ring, Ethernet, etc.). Typically, the host computer 8 will be provided with a front end controller (not shown) which is able to handle data concurrently provided through multiple ports.

Figure 2:
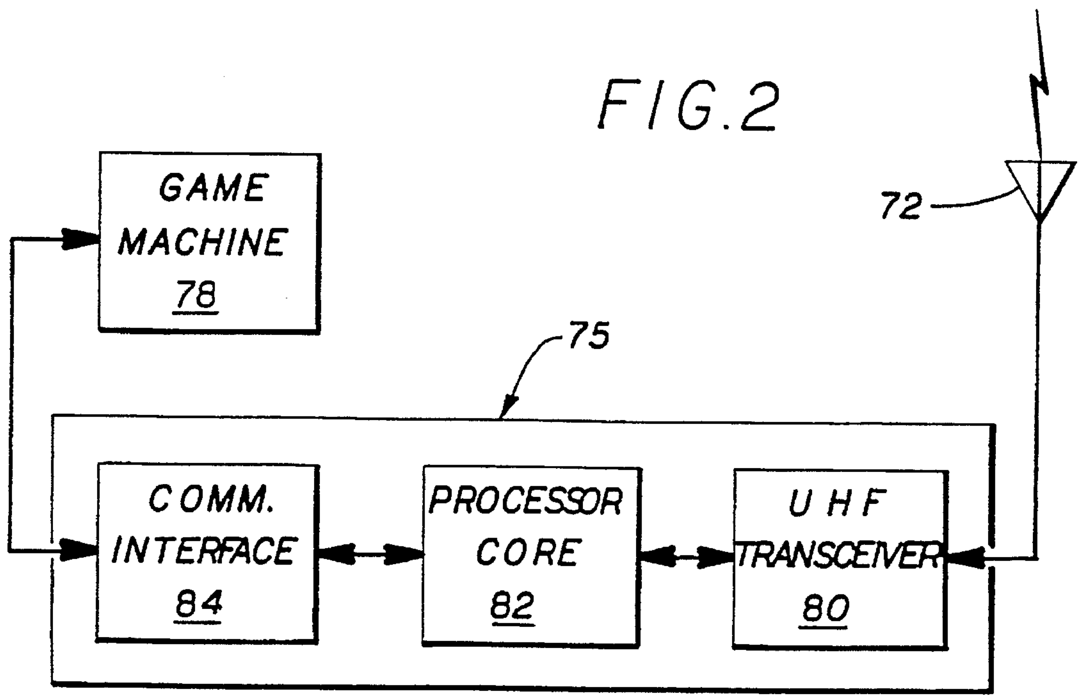
FIG. 2 is a block diagram of a wireless modem which may be used with a candle antenna in preferred embodiments of the present invention.

FIG. 2 is a block diagram depicting a preferred wireless modem for use with a candle antenna of the present invention. As shown, a wireless modem 75 couples a gaming machine 78 with a candle antenna 72. The wireless modem 75 includes a UHF transceiver 80, coupled to a processor core 82 which is, in turn, connected to a communications interface 84. As shown, the candle antenna 72 is directly coupled to UHF transceiver 80, and the game machine 78 is directly coupled to communications interface 84. These elements are realized by good design practice consistent with electrical engineers skilled in the art utilizing selected, commercially available, standard integrated circuits and discrete components appropriate for product requirements and specifications.

Although the details are not shown, the primary and secondary base station radios 12 and 14 each also include a communications interface, a processor core, and a UHF transceiver (which is connected to the associated low profile antenna (16 or 18)). In addition, the base stations 12 and 14 will include a switch used to select one of the two stations as the current designated station (i.e., the station handling communications with the gaming machines on the wireless network). The modems employed in the primary and secondary base stations 12 and 14 as well as the gaming machines perform error checks on the data to ensure that it was received correctly before communicating that data to host computer 8 or the gaming machines 20, 22, 24, or 26.

Preferably, the antennas 16 and 18 are located in the ceiling of an establishment in which the gaming machines 20, 22, 24, and 26 are located. This allows radio frequency signals to be communicated between the gaming machines and the base station radios substantially unimpeded. Preferably, the base station antennas will be provided in the ceiling such that they are not prominently displayed, and preferably not noticeable to the users of the gaming machines.

Figure 3:
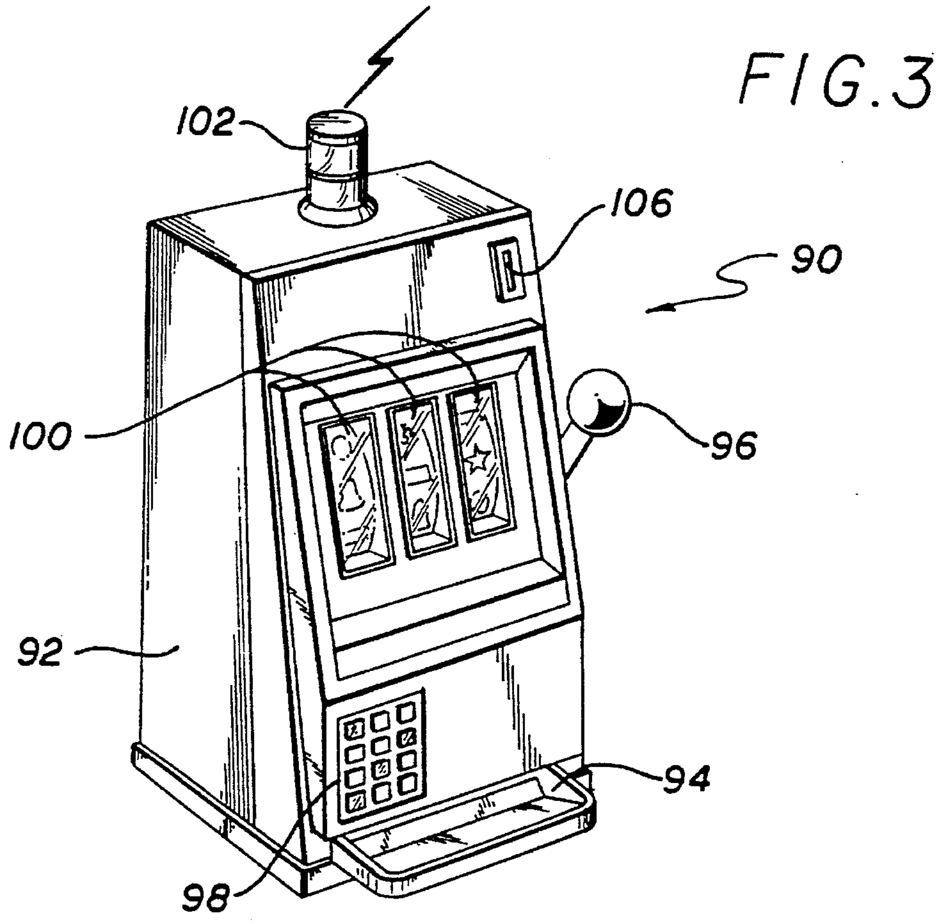
FIG. 3 is perspective view of a gaming machine including a candle antenna in accordance with a preferred embodiment of this invention.

FIG. 3 is an illustration of a gaming machine 90 having a candle antenna 102 provided thereon. As shown, the gaming machine 90 includes a machine chassis 92, various game play option buttons 98, a game play lever 96, and a display 100. It is important to note the candle antenna 102 is located on top of the gaming machine chassis 92 in the same location and orientation as a conventional candle (without an antenna). Further, the candle antenna has the same external appearance as a conventional candle. However, unlike a conventional candle, the candle antenna 102 includes an antenna (not shown) disposed in its interior—which is invisible to a gaming machine player.

To play gaming machine 90, a player inserts coins or tokens through a slot 106, activates the machine by pulling the lever 96, pushing buttons 98, or taking some other action. The player then observes the indicators in display 100 to determine if he or she has obtained a winning combination. If so, the display 100 may indicate the amount won. Simultaneously, any winnings will be dropped into a tray 94. At various stages during this procedure, the candle antenna 102 may be active. For example, if a player does win, a coin hopper in gaming machine 90 may have to be refilled. In this case, a candle light of a particular color will be illuminated. This is an example of a traditional use of a candle. In addition, each coin that enters through slot 106 or leaves through tray 94 will be tallied by machine 90. This tally is periodically communicated via the antenna to a central computer or server in the establishment. This, of course, is an example of a non-traditional use of a candle—and one in accordance with the present invention.

It should be recognized that the candle antennas of the present invention may be used with any conventional gaming machine that employs a candle. Exemplary manufactures of such gaming machines include International Game Technology, of Reno, Nev. and Bally Gaming, Inc. of Las Vagas, Nev. Candles provided on the gaming machines of such vendors typically include two light sources, although some candles may have 1, 3, or 4 light sources. Each such light source is located in a different vertical position and has a different associated color band. This allows the gaming machine to display messages coded by different colors. For example, a yellow light might indicate that a coin hopper is empty and requires the service of an employee in charge of restocking the hopper, and a white color light might indicate an alarm condition such as a machine door being open.

Figure 4A:
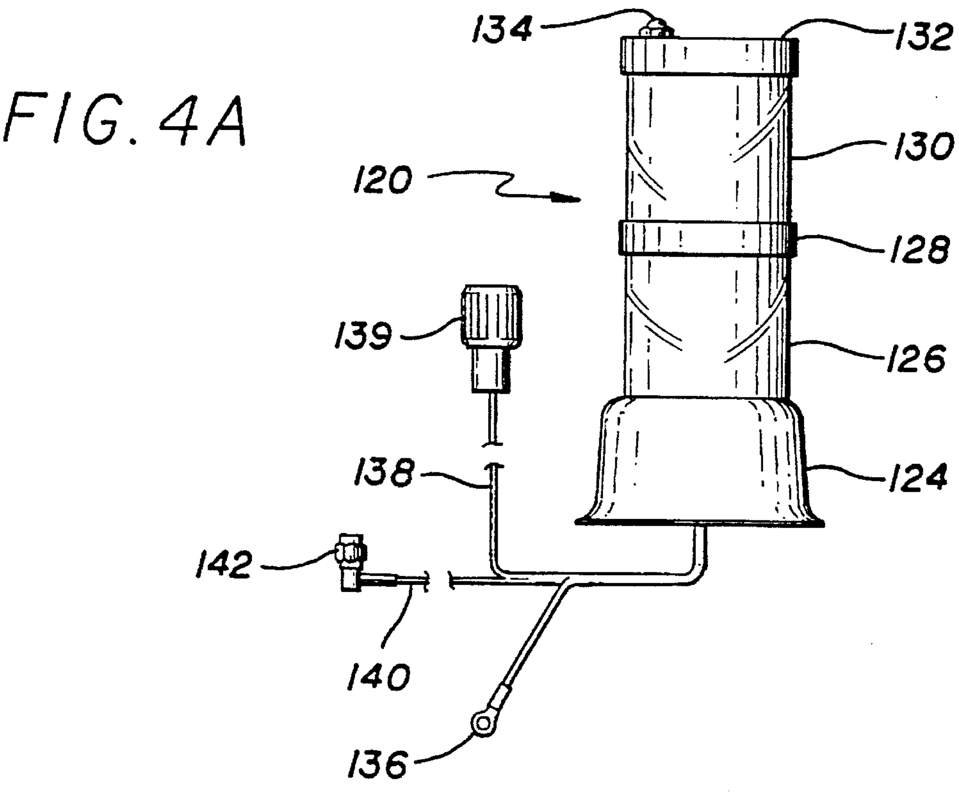
FIG. 4A is an illustration of a candle antenna (separated from a gaming machine).

FIG. 4A is a side exterior view of a candle antenna of the present invention. The candle antenna 120 includes a base 124 adapted to be mounted on gaming machine chassis 92. The base 124 is also adapted to receive a cylindrical sleeve 126 which transmits light of a particular color from a first light source (not shown) disposed within a lower region of candle antenna 120. A divider ring 128 separates the lower cylindrical sleeve 126 from an upper cylindrical sleeve 130. The upper cylindrical sleeve transmits light of a color which is different from that of the light transmitted by lower cylindrical sleeve 126. The upper cylindrical sleeve 130 also serves as a housing for a second light source (not shown) vertically displaced above the first light source provided within lower cylindrical sleeve 126. A cap 132 is provided on top of upper cylindrical sleeve 130. The cap is held in place on top of candle antenna 120 by a nut 134 which is screwed onto a threaded vertical rod (not shown) which spans the interior of candle antenna 120.

Various electrical connections are provided from candle antenna 120. These include a chassis ground strap 136 which is adapted to be electrically coupled to the metal game chassis 92. In addition, a light harness 138 is provided with an appropriate connector 139 to connect to a power source in the gaming machine and thereby provide the voltage necessary to illuminate the first and second light sources. Finally, a flexible coaxial radio frequency cable 140 is provided within the interior of candle antenna 120 and connected to an antenna (not shown). Coaxial cable 140 is terminated with a radio frequency male connector 142 (or other appropriate connector).

Figure 4B:
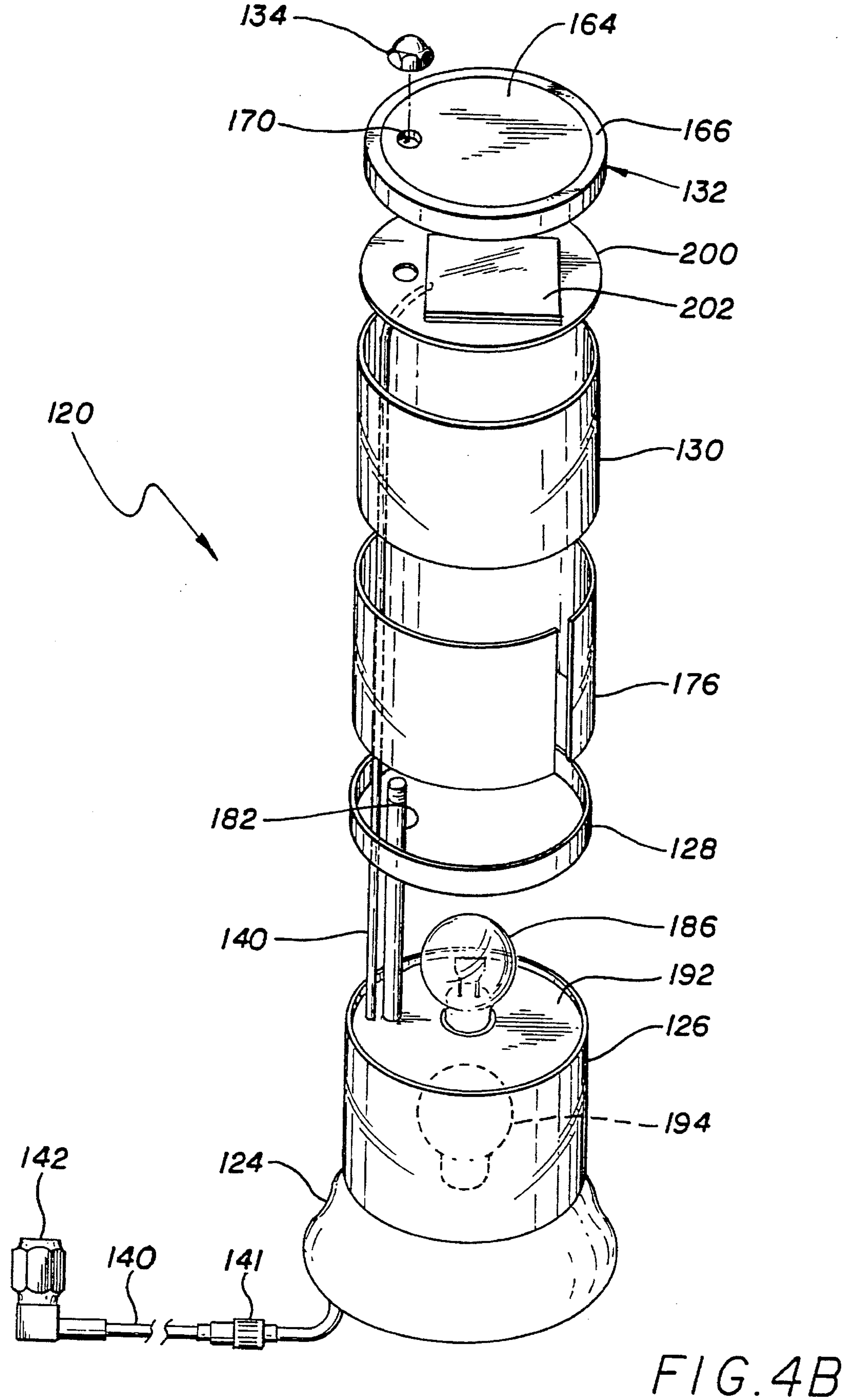
FIG. 4B is an exploded view of a candle antenna in accordance with a preferred embodiment of the present invention.

FIG. 4B is an exploded view of the candle antenna 120 shown in FIG. 4A. The displayed candle antenna 120 is a "two-stage" candle having a bottom stage with a first light source 194 and top stage with a second light source 186. The candle antenna 120 is designed so that when the first light source is illuminated, the bottom stage appears lighted and when the second light source is illuminated, the top stage appears lighted.

The candle antenna 120 includes base 124 which, as explained, is designed to be mounted on the top of a gaming machine—typically by one or more bolts or screws. In addition, it will include provisions for passing the various conductive lines from light sources, an antenna, etc. into the gaming machine. The top of base 124 is sized to receive cylindrical sleeve 126 which forms the candle's outer wall for the first stage. Cylindrical sleeve 126 is preferably made from a plastic such as an uncolored acrylic. Typically, an inner circumferential surface of sleeve 126 will be lined with a flexible colored insert so that when light is emanating from the first stage, it has a specified color. In an alternative embodiment, the same effect can be achieved with a sleeve made from a colored translucent plastic (without resorting to the use of a colored insert). A first light source 194, which is preferably an electric light bulb, is mounted in the base 124 so that when it is illuminated, the bottom stage (through cylindrical sleeve 126) glows to indicate a particular event.

An opaque circular support 192 is provided on top of the first cylindrical sleeve 126 and serves as a support for a second light source 186. In addition, opaque support 192 prevents light from bleeding between the first and second stages. This ensures that when only one of the first or second light sources is illuminated, only the stage associated with that light source will appear to be emanating light. A divider ring 128 rests on top of the plastic cylindrical sleeve 126 and supports a second cylindrical sleeve 130 which defines the upper stage. Typically, the divider ring will be made from a plastic material having a decorative coating, such as a chrome coating. Further, the divider ring 128 will be open in the middle so that it can rest on top of sleeve 126 without contacting the second light source 186. It should be noted, that like the first light source 194, second light source 186 is preferably an electric light bulb.

The top stage of candle antenna 120 is defined by the second cylindrical sleeve 130 which totally encloses second light source 186. Preferably, the sleeve 130 is made from a transparent plastic and is lined with a flexible color plastic insert 176. Of course, the plastic sleeve itself could be made from a colored opaque material. Regardless of the means by which the top and bottom stages are colored, the particular colors of the top and bottom stages will generally be different and chosen according to a casino operator's preference. As explained above, illumination of each stage of a candle has a particular meaning to casino operators.

A vertical conductive rod 182 (typically a brass rod) is mounted in base 124 and spans the height of the candle antenna. The opaque circular support 192 will have an appropriately located hole to allow rod 182 to pass through it. At the top of rod 182, a nut 134 is provided to hold the various components of the candle antenna together. In conventional candles, as well as the candle antennas of this invention, the rod serves as a conductive path to ground (through ground line 136) for static discharges applied to the candle. It has been observed that some individuals have attempted to defeat security mechanisms in gaming machines by applying strong static discharges to candles and other gaming machine componentry.

A conductive ground plane 200 is mounted in electrical contact with conductive rod 182 near the top of rod 182. Preferably, ground plane 200 will be circular and sized to snugly fit within second clear plastic sleeve 130. An antenna 202 is mounted (preferably by soldering) on ground plane 200 and has an associated coaxial cable 140. Cable 140 extends downward from antenna 202 through the candle antenna 120 and out through base 124. As mentioned above, the coaxial cable 140 will be terminated with an RF male connector 142 which connects to a wireless modem in the gaming machine itself.

Preferably, an appropriate RF connector 141 is attached to the antenna 202 so that coaxial cable 140 can be disconnected from the antenna. This allows damaged antennas to be easily replaced like light bulbs. Further, it allows different types of antennas to be installed to provide additional isolation between base station cells (assuming that there are multiple base stations in the same casino). This second point is important if the gaming machine is to be moved about in a large casino where isolation between base stations relies, at least in part, on polarization of electromagnetic signals. The type of antennas used to transmit electromagnetic energy will have either a left hand or right hand circular polarization. Signals with left hand circular polarization are not easily received by antennas designed to receive signals with right hand circular polarization—and vice-versa. Thus, by providing some casino gaming machines with one type of antenna and other gaming machines with another type of antenna, good isolation between base station cells can be obtained.

A cap 132 is provided at the top of candle antenna 120. Cap 132 includes a small hole 170 through which the rod 182 passes. A nut 134 is positioned above cap 132 and screws down onto rod 182 to hold the whole candle antenna assembly together. Cap 132 is preferable made from a plastic material that includes a decorative chrome coating 166 along its outer perimeter. However, cap 132 should also have a central region 164 (disposed above antenna 202) which is non-conductive. This allows radio frequency signals to freely pass to and from antenna 202.

It should be noted that in most regards candle antenna 120 appears to a gaming machine user to be identical to a conventional candle (i.e., one which is not used for wireless communication). One difference, however, is the lack of a conductive chrome coating in region 164 of cap 132. However, because the eye level of a gaming machine user is below the candle, the user should not notice this difference. To the extent that the user can see cap 132, he or she will note that it has a reflective chrome coating 166 like a conventional candle. Further, ground plane 200 will prevent light from top light source 186 from passing through the top candle antenna 120. Thus, no additional illumination from the top of the candle should be observable.

In preferred embodiments, coaxial cable 140 is positioned along a line of sight between rod 182 and light sources 186 and 194. Thus, coaxial cable 140 will not cast a shadow which is distinct from a shadow cast by rod 182. This further camouflages the presence of antenna 202. Preferably, the coaxial cable 140 is aligned so that it will be directly in front of the conductive rod (i.e., upstream from the rod in the line of sight with the light sources). A shadow cast by the cable should be coextensive with a shadow cast by the conductive rod.

In general, the ground plane 200 is provided between the antenna 202 and the interior of the candle so that the other components of the candle have no effect on the radiation pattern of the antenna. Antennas from various vendors can be used with the present invention. However, in general, the antenna should have a symmetric radiation pattern which is hemispherical and directed above a horizontal plane defined by the ground plane. Because the gaming machines used with the present invention may be moved to various positions within an establishment (e.g., a casino), a hemispherical radiation pattern ensures communication with base station radios installed at a central location in the establishment. Preferably, that location is a ceiling.

The antenna may be one of the various commercially available antennas which meet the size and radiation frequency requirements of this invention. For example, the antenna 202 may be a patch antenna, a helical antenna, a linear antenna, etc. Suitable antennas may be obtained from Micropulse, Inc. of Camarillo, Calif. or from M/A-COM, Inc. of Lowell, Mass. The antenna 202 may be customized to the extent that it is integrated with, and attached to circular ground plane 200 which is designated to attach to the conductive rod 182 and accommodate a mechanical strain-relief feature for the coaxial cable. In an alternative embodiment, the antenna used in the candle is chosen to have a ground plane incorporated in the antenna itself, and have no separate ground plane 200.

Preferably, a candle antenna of this invention employs a radio frequency band that does not require a Federal Communications Commission ("FCC") site license in the United States. Thus, the band should be an Industrial, Scientific, and Medical band ("ISM") meeting the FCC restrictions on effective radiated power. In addition, the system should employ a spread spectrum broadcasting technique. Various "non-license" bands in the United States are available from the FCC including 902 to 928 MHz, 2.4 to 2.4835 GHz, and 5.6 to 5.7 GHz as specified in FCC regulation § 15.247. Preferably, for this invention, the 2.4 to 2.4835 GHz band will be employed. This band is reasonably far removed from heavily used bands such as cellular radio and cellular telephone bands (unlike the 902–928 MHz band.). Further, the componentry required for this band is less expensive than that required for higher frequency bands such as the 5.6–5.7 GHz band. In general, the expense of radio equipment is nearly directly proportional to its band frequency. It should be understood that this application discusses frequency ranges as specified in by the FCC for the Untied States. Operation in different frequency ranges may be preferred in areas outside the United States.

An alternative embodiment of the present invention is illustrated in FIGS. 4C (side view) and 4D (top view). The candle antenna 200 of this embodiment includes first and second light bulbs 202 and 204 mounted on first and second lamp holders 206 and 208 and first and second lamp mounting tabs 212 and 214. The lamp mounting tabs are supported on and affixed to support post 216 which corresponds to conductive rod 182 in the embodiment of FIG. 4B. The support post 216 also supports on antenna assembly 220 which is preferably ceramic disk that includes a conductive ground plane 222. The circuitry for the antenna is provided on a conductive region 224 which is electronically coupled to a coaxial cable 226 via a connector 228. As illustrated, this embodiment does not require separate ground plane an antenna elements. Often the antenna is supplied by vendors in this format. In a preferred embodiment, the antenna assembly is affixed to a lid (not shown) by an adhesive such as double sided tape. The adhesive is provided on the top surface of the antenna assembly 220 on the region surrounding the conductive region 224. In an alternative embodiment, the antenna is provided on top of a candle's lid.

Although the foregoing invention has been described in some detail for purposes of clarity of understanding, it will be apparent that certain changes and modifications may be practiced within the scope of the appended claims. For instance, although the specification has described a cylindrical candle antenna, other shapes may be used as well. For example, a pyramidal or rectangular candle antenna may also be used. In addition, the reader will understand that the wireless modem associated with a gaming machine as describe herein can be located most anywhere within the gaming machine, and, in some embodiments, may even form part of the candle antenna itself.

What is claimed is:

1. A candle antenna assembly comprising:

a substantially hollow candle housing which is at least partially transparent to light;

a first light source disposed within said candle housing;

an antenna disposed within said candle housing; and a mounting mechanism configured to mount said candle antenna assembly to a gaming machine.

2. The candle antenna of claim 1 wherein said antenna is positioned above the first light source.

3. The candle antenna of claim 1 further comprising a ground plane having a top surface on which said antenna is mounted.

4. The candle antenna of claim 1 wherein the antenna is affixed to a lid on top of the candle housing.

5. The candle antenna of claim 1 further comprising a rod within the candle housing which is oriented in a substantially vertical direction.

6. The candle antenna of claim 5 wherein the antenna is supported by said rod such that the antenna is oriented substantially horizontally.

7. The candle antenna of claim 5 wherein said antenna is coupled to a conductive line extending within said housing substantially in parallel with said rod.

8. The candle antenna of claim 7 wherein said conductive line is positioned along a line of sight defined by said rod with respect to said first light source such that when said first light source is illuminated, said conductive line casts no shadow beyond that shadow cast by said rod or casts a shadow that is substantially coextensive with any shadow that would be cast by the rod if the conductive line was not in place.

9. The candle antenna of claim 1 wherein said antenna transmits and receives radio frequency signals in a substantially hemispherical intensity distribution.

10. The candle antenna of claim 9 wherein said antenna is horizontally oriented within said candle housing, wherein said hemispherical intensity distribution is defined above a horizontal plane defined by the antenna.

11. The candle antenna of claim 1 further comprising a second light source also disposed within said candle housing, said second light source being vertically displaced from said first light source.

12. The candle antenna of claim 11 further comprising an opaque divider separating the first light source form the second light source such that when one of said light sources is illuminated, light from that source is substantially prevented from bleeding through to the other light source.

13. The candle antenna of claim 1 further comprising a transceiver which sends and receives spread spectrum signals.

14. The candle antenna of claim 1 further comprising a cap located on said candle housing and above the antenna, wherein the cap includes a nonconductive region which allows transmission of radio frequency signals to and from said antenna.

15. A gaming machine comprising:

a machine chassis having an upper surface and a candle antenna mounted on said machine chassis upper surface, said candle antenna including a substantially hollow candle housing which is at least partially transparent to light, a first light source disposed within said candle housing, an antenna disposed within said candle housing.

16. The gaming machine of claim 15 further comprising a ground plane disposed within said candle housing and having a top surface on which the antenna is mounted.

17. The gaming machine of claim 15 further comprising a rod disposed within the candle housing and oriented substantially vertically, wherein the antenna is supported by the rod such that the antenna is oriented substantially horizontally.

18. The gaming machine of claim 17 further comprising a transceiver, wherein said antenna is coupled to a conductive line extending within said housing substantially in parallel with said rod and into the gaming machine chassis where it is electrically coupled to the transceiver.

19. The gaming machine of claim 15 further comprising a second light source also disposed within the candle housing.

20. The gaming machine of claim 19 further comprising an opaque divider separating the first light source from the second light source such that when one of the lights sources is illuminated, light from that source is substantially prevented from bleeding through to the other light source.

21. The gaming machine of claim 15 further comprising a cap located on top of said candle housing and above the antenna, wherein the cap has a nonconductive region which allows transmission of radio frequency signals.

22. A communication system in an establishment, the system comprising:

a plurality of gaming machines, at least one of the plurality of gaming machines which includes a machine chassis having an upper surface, a candle mounted on said machine chassis upper surface, an antenna disposed within the candle, and a first transceiver electrically coupled to said antenna;

a host computer programmed to process data from said at least one of the plurality of gaming machines; and a second transceiver electrically coupled to said host computer, wherein the at least one of the plurality of gaming machines and the host computer form part of a LAN.

23. The system of claim 22 wherein said host computer is part of a WAN.

24. The system of claim 22 wherein said first and second transceivers are adapted to send and receive spread spectrum signals.

25. The system of claim 22 wherein said antenna transmits and receives radio frequency signals over a substantially hemispherical intensity distribution.

26. The system of claim 25 wherein said second transceiver is provided with a second antenna located proximate to a ceiling of said establishment.

27. A method of communicating over a wireless LAN having a plurality of gaming machines and a host computer programmed to process data from said plurality of gaming machines, the method comprising the following steps:

generating playing data at one of said plurality of gaming machines; and transmitting said data through an antenna on one of said gaming machines, the antenna being located within a candle disposed on the one gaming machine, wherein, the data is transmitted in a frequency range for which a transceiver associated with the host computer is tuned.

28. The method of claim 27 wherein the playing data is transmitted from the antenna in signals having a substantially hemispherical intensity distribution above a horizontal plane at the location of the antenna.

29. The method of claim 27 further comprising a step of receiving said playing data at said transceiver associated with the host computer.

30. The method of claim 29 further comprising a step of sending data from said transceiver associated with the host computer to said antenna disposed within the candle.

* * * * *